United States Patent
Pattabhiraman et al.

(10) Patent No.: US 11,909,542 B2
(45) Date of Patent: Feb. 20, 2024

(54) EVPN PIM NEIGHBORSHIP

(71) Applicant: Arista Networks, Inc., Santa Clara, CA (US)

(72) Inventors: Bharathram Pattabhiraman, San Jose, CA (US); Suresh Nalagatla, Fremont, CA (US); Saravanan Balasubramanian, Belmont, CA (US); Prashant Srinivas, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 69 days.

(21) Appl. No.: 17/667,266

(22) Filed: Feb. 8, 2022

(65) Prior Publication Data

US 2023/0254170 A1    Aug. 10, 2023

(51) Int. Cl.
*H04L 12/18*  (2006.01)
*H04L 45/16*  (2022.01)
*H04L 12/46*  (2006.01)

(52) U.S. Cl.
CPC .......... *H04L 12/18* (2013.01); *H04L 12/4641* (2013.01); *H04L 45/16* (2013.01)

(58) Field of Classification Search
None
See application file for complete search history.

(56) References Cited

U.S. PATENT DOCUMENTS

| | | | | |
|---|---|---|---|---|
| 7,969,980 B1* | 6/2011 | Florit | ...................... | H04L 49/35 370/409 |
| 8,345,536 B1* | 1/2013 | Rao | ........................ | H04L 49/201 370/219 |
| 11,057,235 B1* | 7/2021 | Varahabhotla | ........ | H04L 12/185 |
| 2013/0003732 A1* | 1/2013 | Dholakia | ................ | H04L 12/18 370/390 |
| 2017/0034047 A1* | 2/2017 | Bhattacharya | .......... | H04L 45/02 |
| 2018/0102911 A1* | 4/2018 | Kojima | ................. | H04L 67/568 |
| 2020/0177402 A1* | 6/2020 | Mishra | ................ | H04L 67/2895 |
| 2020/0259672 A1* | 8/2020 | Meng | ................. | H04L 12/1886 |
| 2021/0099379 A1* | 4/2021 | Kaliyamoorthy | ....... | H04L 45/16 |
| 2021/0400017 A1* | 12/2021 | Pathikonda | ........... | H04L 61/256 |

FOREIGN PATENT DOCUMENTS

| EP | 3396897 B1 * | 9/2021 | ............. | G06F 9/542 |
|---|---|---|---|---|
| WO | WO-2012058990 A1 * | 5/2012 | ............. | H04L 45/02 |

* cited by examiner

*Primary Examiner* — Kenny S Lin
(74) *Attorney, Agent, or Firm* — Fountainhead Law Group P.C.

(57) ABSTRACT

Protocol-Independent Multicast (PIM) uses PIM hello messages to maintain neighborship information. PIM may be implemented in an Ethernet VPN (EVPN) providing Optimized Inter-Subnet Multicast (OISM). Techniques are disclosed for improving PIM neighborship efficiency and speed in an EVPN. An Inclusive Multicast Ethernet Tag (IMET) may be used to set PIM neighborship instead of using PIM hello messages and TCP may be used to determine if the neighbor is disconnected instead of tracking PIM timers.

20 Claims, 4 Drawing Sheets

EVPN PIM NEIGHBORSHIP

BACKGROUND

The present disclosure pertains to computer networks, and in particular to Protocol Independent Multicast (PIM) neighborship over an Ethernet virtual private network (EVPN).

In an EVPN, a provider edge device (PE) may connect with a tenant PIM domain. PIM hello messages sent at particular intervals may be used by PEs to determine PIM neighborship. However, the interval between PIM hello messages may cause delays in determining PIM neighborship. The present disclosure addresses these issues and others, as further described below.

SUMMARY

Some embodiments provide a computer-implemented method. The method includes receiving a first message from a gateway device over a network connection. The first message includes first neighbor information and one or more flags indicating that the first neighbor information may be used to establish protocol-independent multicast neighborship. The method further includes modifying a protocol-independent multicast neighbor table based on the neighbor information. The method further includes sending a second message to the gateway device over the network connection. The second message includes second neighbor information and the one or more flags indicating that the second neighbor information may be used to establish protocol-independent multicast neighborship.

Some embodiments provide a computer system. The computer system comprises one or more processors and one or more machine-readable medium coupled to the one or more processors. The one or more machine-readable medium storing computer program code comprising sets of instructions executable by the one or more processors. The sets of instructions executable to receive a first message from a gateway device over a network connection. The first message includes first neighbor information and one or more flags indicating that the first neighbor information may be used to establish protocol-independent multicast neighborship. The sets of instructions are further executable to modify a protocol-independent multicast neighbor table based on the neighbor information. The sets of instructions are further executable to send a second message to the gateway device over the network connection. The second message includes second neighbor information and the one or more flags indicating that the second neighbor information may be used to establish protocol-independent multicast neighborship.

Some embodiments provide one or more non-transitory computer-readable medium storing computer program code comprising sets of instructions. The computer program code includes sets of instructions to receive a first message from a gateway device over a network connection. The first message includes first neighbor information and one or more flags indicating that the first neighbor information may be used to establish protocol-independent multicast neighborship. The computer program code further includes sets of instructions to modify a protocol-independent multicast neighbor table based on the neighbor information. The computer program code further includes sets of instructions to send a second message to the gateway device over the network connection. The second message includes second neighbor information and the one or more flags indicating that the second neighbor information may be used to establish protocol-independent multicast neighborship.

DETAILED DESCRIPTION

Figure 1:
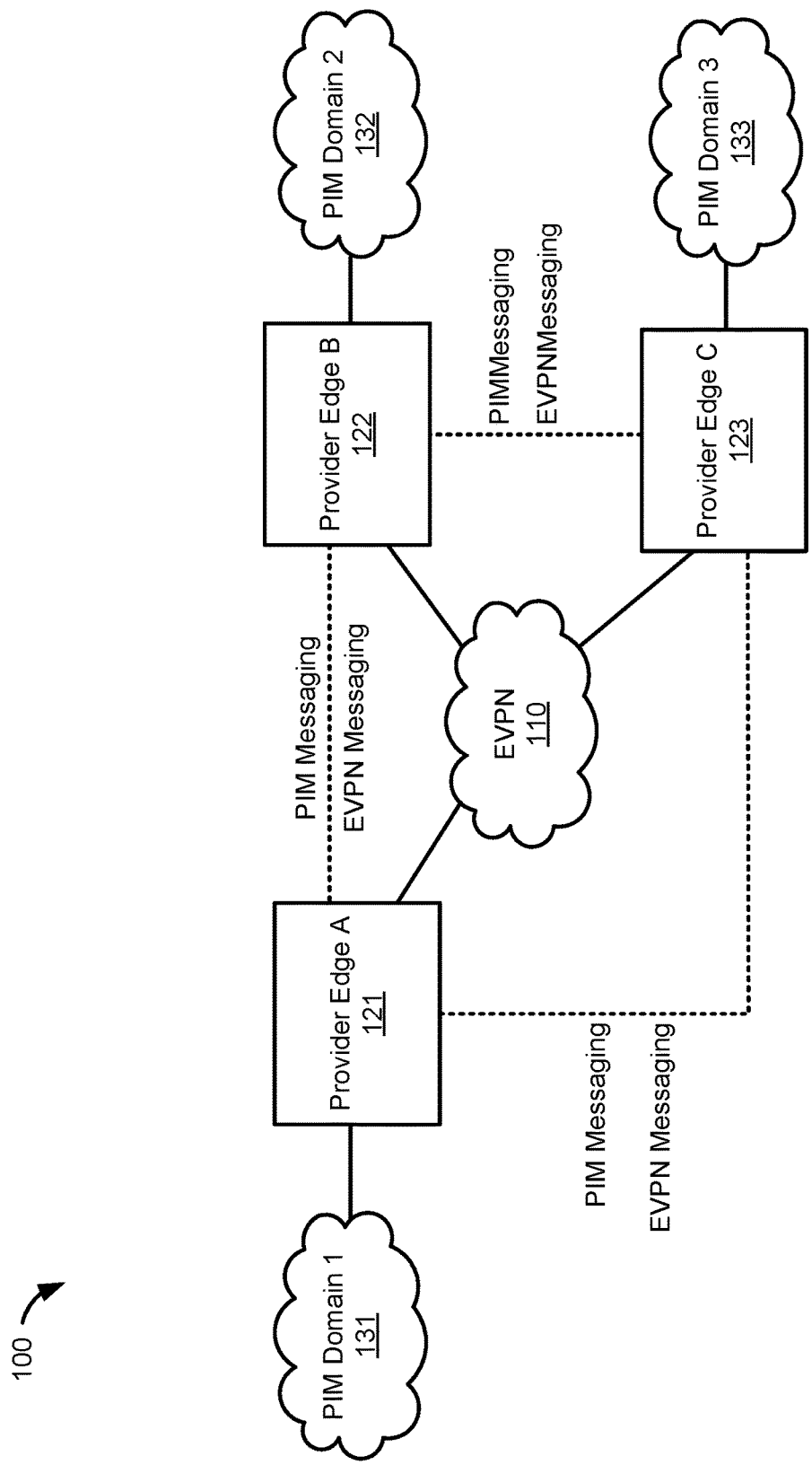
FIG. 1 shows a diagram of an Ethernet virtual private network, according to an embodiment.

As described above, an EVPN provider edge device (PE) may connect with a tenant PIM domain. Such PE devices may be referred to as a PIM external gateway (PEG). In an EVPN network, PEG devices may discover each other as PIM neighbors using PIM "hello" messages, which are sent by routing devices at a particular interval to advertise their existence on the subnet. In some implementations of EVPN that provide Optimized Inter-Subnet Multicast (OISM) Forwarding procedures, PEG devices may exchange encapsulated PIM hello messages among each other.

However, advertising PIM hello messages at intervals has shortcomings in certain situations. For instance, detecting that a PEG router is down may take three and a half times the PIM hello interval. Another drawback is that PIM hello messages are delivered using "best effort," which does not guarantee delivery or provide for retransmission of corrupted or lost packets. This may be problematic if the EVPN network is unreliable, especially where the PEG device is many hops away. Another drawback is that PIM hello messages are a broadcast message and are sent to every device in the EVPN network that shares a broadcast domain, the message being multiplied to other PE devices in the network, thereby flooding the network to a certain extent. Also, when an EVPN network is used for transit, a number of double delivery scenarios may be resolved via PIM "assert" messages. In such cases, it may be advantageous to quickly detect when a PIM neighbor is down and resume forwarding traffic. Accordingly, there is a need for improved PIM neighborship and detection of PIM neighbors going down.

This disclosure provides a PIM neighborship technique that takes advantage of the reliability of the BGP transport and "Multicast Flags," an EVPN extended community, in an EVPN Inclusive Multicast Ethernet Tag (IMET) route message. Instead of sending PIM hello broadcast messages (e.g., over a core for a supplemental bridge domain (SBD) Virtual local area networks (VLAN)) and detecting PIM neighbors based on those PIM hello messages, the IMET messages exchanged between PEs (e.g., in the SBD VLAN) can be used to detect PIM neighbors and update a PIM neighbor table. For instance, when an IMET route message with the "Multicast Flags" extended community attached to it is imported into a PE's Media Access Control (MAC) Virtual Routing and Forwarding (VRF) table, with both PEG flag and the OISM flag set, PIM neighborship can be declared with the originating PE device as being up. Conversely, when the IMET message is withdrawn or when the PEG and/or OISM flags are reset (e.g., set to off), the PIM neighborship with the originating tunnel end point (TEP) may be immediately declared as down (e.g., without waiting for multiple missed hello messages as in other techniques).

As used herein, the term "flag" refers to data that sets a binary value. The flag may be used to determine whether a particular option is set (on) or not set (off). A flag may be either "on" or "off," or it may be set to "1" (e.g., set "on") or "0" (e.g., set to "off"). A flag may be a one bit field of a message, for example. A field containing multiple bits, such as a field used to indicate 3 or more different types, may not be referred to as a "flag" because it is not binary and it does not set one particular option as being on or off, but selects from among more than one option. A field selecting between two options using a single bit may still not be considered a "flag" as such a field is not setting one single option on or off but is selecting between two different options.

Using this neighborship technique, there is no longer a need to periodically send PIM hellos to keep the PIM neighborship alive. This avoids broadcasting PIM hellos and the need for every PEG device to manage timers to track liveliness of the PIM neighbors. Periodic PIM hellos may still be used for interoperability with systems not implementing PIM neighborship based on IMET messages.

An EVPN with Provider Edge devices connected to corresponding PIM domains is described with respect to FIG. 1. A Provider Edge device is described with respect to FIG. 2. A process for determining PIM neighborship is described with respect to FIG. 3. An exemplary IMET message with flags set to indicate use of the IMET based PIM neighborship technique is described with respect to FIG. 4.

FIG. 1 shows a diagram 100 of an Ethernet Virtual Private Network (EVPN) 110, according to an embodiment. Ethernet Virtual Private Networks (EVPN) is a Border Gateway Protocol (BGP) control plane that enables a Local Area Network (LAN) comprising a single Internet Protocol (IP) subnet to provide Layer 2 connectivity, which appears to be bridged, between different sites (e.g., data centers). An EVPN may comprise Customer Edge devices (CEs) connected to Provider Edge devices (PEs). A CE may be a host, a router, or a switch, for example. The PEs provide virtual Layer 2 bridged connectivity between the CEs. In this embodiment, three provider edge (PE) devices, Provider Edge A 121, Provider Edge B 122, and Provider Edge C 123 are communicating with each other in the EVPN 110. An EVPN Broadcast Domain (BD) may comprise multiple ethernet "segments," and each segment may be attached to a different EVPN PE. EVPN Optimized Inter-Subnet Multicast (OISM) Forwarding is a technique that allows inter-subnet Internet Protocol (IP) multicast traffic to be routed among LANs of a given tenant while intra-subnet IP multicast traffic still appears to be bridged.

Protocol Independent Multicast (PIM) is a multicast routing protocol that allows for efficient routing of multicast groups without relying on a specific unicast routing protocol. Layer 3 multicast routing may be done via PIM. In this case, the interworking between the "PIM domain" and the EVPN tenant domain may be done at L3 Gateways that perform "PIM/EVPN Gateway" (PEG) functionality. In this embodiment, each provider edge is coupled to a corresponding PIM domain. Provider Edge A 121 is coupled to PIM Domain 1 131. Provider Edge B 122 is coupled to PIM Domain 2 132. And Provider Edge C 123 is coupled to PIM Domain 3 133.

As shown in diagram 100, the three PE devices 121, 122, 123 may communicate PIM messages (including PIM hellos) and EVPN messages (including IMET messages) with each other via the EVPN 110. This messaging may use a route reflector, for example. In diagram 100, the PIM and EVPN messaging between the PEs are shown with dotted lines, which indicates that the messaging is indirect, via the EVPN 110.

Figure 2:
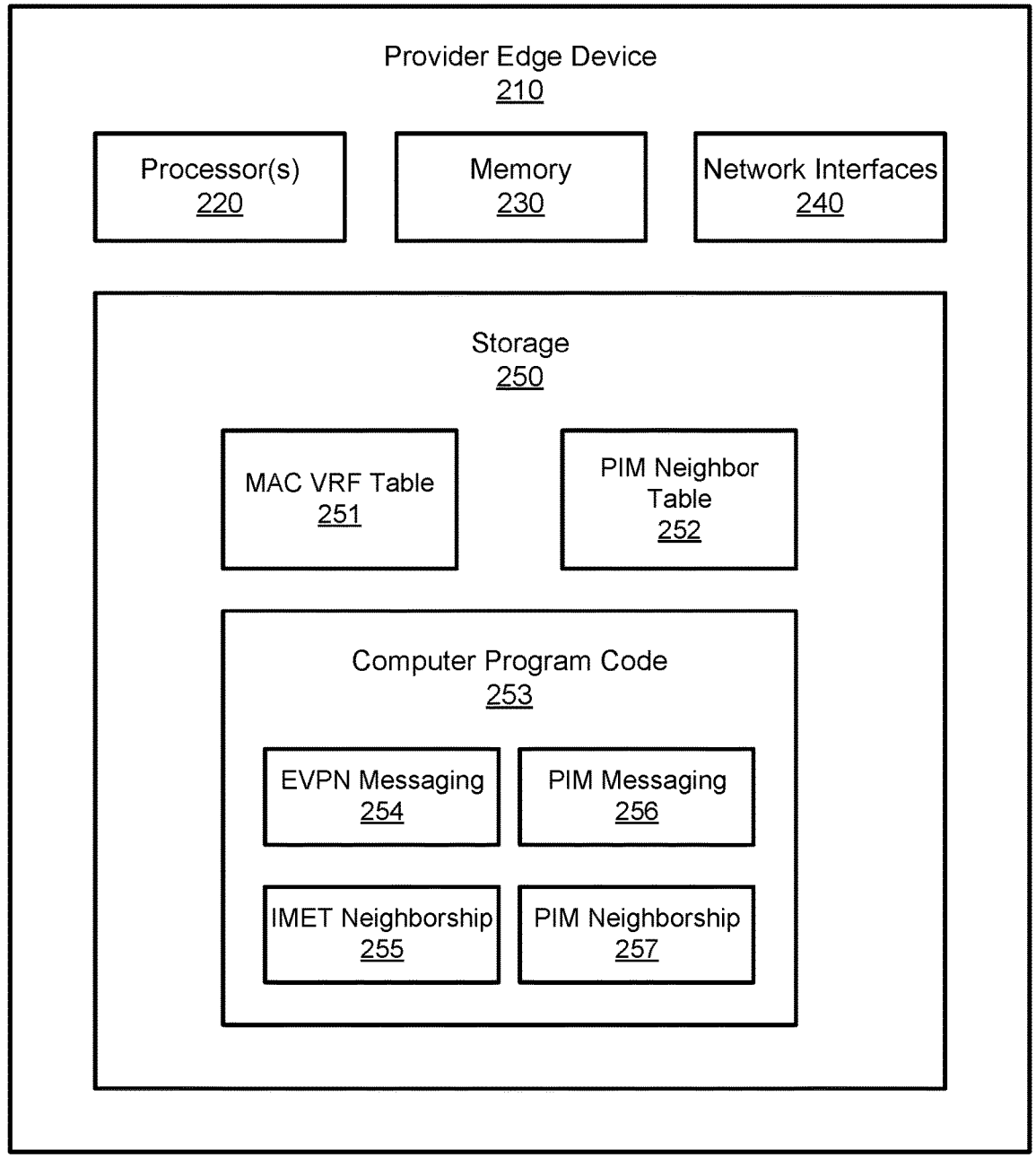
FIG. 2 shows a diagram of a provider edge device, according to an embodiment.

FIG. 2 shows a diagram 200 of a provider edge device 210, according to an embodiment. The provider edge (PE) device 210 (referred to as a "PE," "PE device," or "PE gateway" herein) is a computer device configured as a network router. The PE device 210 may route communication between a network service provider's area and areas administered by other network providers, for example. The PE device 210 may be configured to determine PIM neighborship.

The PE device 210 includes one or more processors 220, memory 230, a plurality of network interfaces 240, and storage 250. The one or more processors 220 may include computer processing chips having one or more cores and internal processing memory. The processors 220 may be configured to execute computer program code for implementing various routing functions as well as the PIM neighborship technique described herein. The memory 230 may comprise Random-access memory (RAM) chips. The processors 220 may be electrically coupled to the memory 230 and may write and read data to and from the memory 230. In some embodiments, the PE device 210 may include additional memory such as flash memory or packet buffer memory. The processors 220 may also be electrically coupled to the plurality of network interfaces 240. The processors 220 may provide data to the network interfaces 240 to be transmitted over a network and may obtain data received by the network interface 240 over the network. For example, the processor 220 of the PE device 210 may send and receive IMET messages and PIM hello messages to other PE devices via the network interfaces 230.

The PE device also includes the storage device 250. The storage device 250 may comprise a solid state disk drive, hard disk drive, or flash memory, for example. In this embodiment, the storage includes a Media Access Control (MAC) Virtual Routing and Forwarding (VRF) table 251, a PIM Neighbor Table 252, and computer program code 253. The storage device 250 may also store other information for use by the PE device 210, such as routing tables or configurations.

The MAC VRF Table 251 is a virtual routing and forwarding table for media access control addresses on the PE 210. The MAC VRF table 251 may be used for a particular subnet. In an EVPN, Inclusive Multicast Ethernet Tag (IMET) route messages received from other PEs (e.g., via a route reflector) may be imported into the MAC VRF table 251 as part of a BGP procedure for detecting BGP peers using a Transmission Control Protocol (TCP) connection. An IMET message may be used to call out broadcast domains in the EVPN. Each provider edge device in the network may send an IMET message. For instance, IMET messages may be sent and received when the PE devices power on. One difference between an IMET message and a PIM hello message is that the IMET message is not physically duplicated to every provider edge from the source device, whereas PIM hellos are multicast messages. In an EVPN, an IMET message may be sent to a route reflector and the route reflector may in turn send copies of the IMET message to another other provider edge device. That is, the information is disseminated from a central place.

Using IMET messages for PIM neighborship, as described herein, is advantageous because IMET messages are sent using TCP connections, which are deemed "reliable" because they track order of bytes and provide for detection of lost data and retransmission of data. The reliable TCP connection contrasts with PIM hello messages, which are transmitted with "best effort" (e.g., no retransmission or guarantee of delivery or quality). If the connection used by BGP goes down, this may be detected via TCP without the need to track a certain number of missed messages as with PIM hellos.

The PIM neighbor table 252 is a table for storing information about PIM neighbors. PIM Neighbor table may include for each neighbor: a Neighbor Address, which specifies a PIM neighbor's IP address, an indicator of an interface where a PIM neighbor was discovered, an uptime value indicating the total uptime of neighbor, and an Expires value indicating the time before a neighbor is timed out and until next PIM hello is received. The PIM neighbor table may be populated based on information received in PIM hello messages.

PIM hello messages are multicast messages that are sent periodically on PIM-enabled interfaces. A received PIM hello message may contain a source IP address of the neighbor, for example. The PIM hello messages enable a router to learn about the neighboring PIM routers on each interface. A per-interface hello Timer may be used to trigger sending hello messages. A header of the PIM hello message may include sets of bits indicating the PIM version, the type of the PIM message (e.g., hello, register, assert, etc.), and a checksum, for example. In PIM, a hello timer may be used to set the periodic interval (e.g., hello period) for transmitting PIM hello messages. A different timer, referred to as a neighbor liveliness timer may be used to track a time for keeping a neighbor alive in the table. The hold time may be 3.5 times the periodic interval (hello period).

The storage 250 also stored computer program code 253. The computer program code 253 includes code (e.g., instructions) for performing EVPN messaging 254, PIM messaging 256, IMET Neighborship 255, and PIM neighborship 257, along with other code (e.g., for performing routing functions). EVPN messaging code 254 includes instructions for sending and receiving messages based on EVPN and OISM as discussed herein. PIM messaging code 256 includes instructions for sending and receiving messages based on PIM (e.g., PIM hellos) as discussed here. IMET Neighborship 255 includes instructions for sending and receiving IMET messages and for tracking peers in the MAC VRF Table 251. PIM Neighborship code 257 includes instructions for tracking PIM neighbors in PIM neighbor table 252. In some embodiments the computer program code 253 may be stored separately from the storage 250 (e.g., in a different storage). In some embodiments, the code for EVPN messaging 254, PIM messaging 256, BGP peer tracking 255, and PIM neighborship 257 may be stored in other storage.

As mentioned above, the IMET messages exchanged between PEs (e.g., in the SBD VLAN) can be used to detect PIM neighbors and update a PIM neighbor table. The IMET neighborship code 255 may also be configured to determine whether both the PEG flag and the OISM flag set of an IMET message are set, thereby indicating that the source PE is capable of using IMET messages for PIM neighborship instead of PIM hello messages. The IMET neighborship code 255 may be further configured to determine PIM neighborship based on the IMET messages and to update the PIM neighbor table 252 based on an IMET message. For example, when the IMET message is withdrawn or when the PEG and/or OISM flags are reset (e.g., set to off), the PIM neighborship with the originating tunnel end point (TEP) may be immediately declared as down in the PIM neighbor table 252 (e.g., without waiting for multiple missed hello).

If the OISM flag is reset, that indicates that OISM techniques (e.g., optimized multicasting) may not be used. Accordingly, there is no reason to declare that the PE is a valid neighbor. The PEG flag being reset indicates that the source PE does not have any PIM speakers attached to it. In this case, the PE does not need to declare the source PE as a PIM neighbor because the source PE may not perform any PIM related actions.

An IMET message is withdrawn when the node no longer exists or is disconnected. This may be detected via BGP neighborship, which is established using a TCP connection. If the connection can be determined to be down over some threshold, then the BGP neighbor down can be declared as down, and all the routes for that BGP speaker may be invalidated. This invalidation propagates through the network, potentially through the route reflector, and every device in the network may invalidate the route.

The PIM messaging code 256 may be configured to determine whether IMET messages may be used to handle PIM neighborship for particular PEs. If so, PIM hello messages may not be sent to those PEs. PIM messages may still be sent to devices that are not configured to use IMET messages for PIM neighborship.

Figure 3:
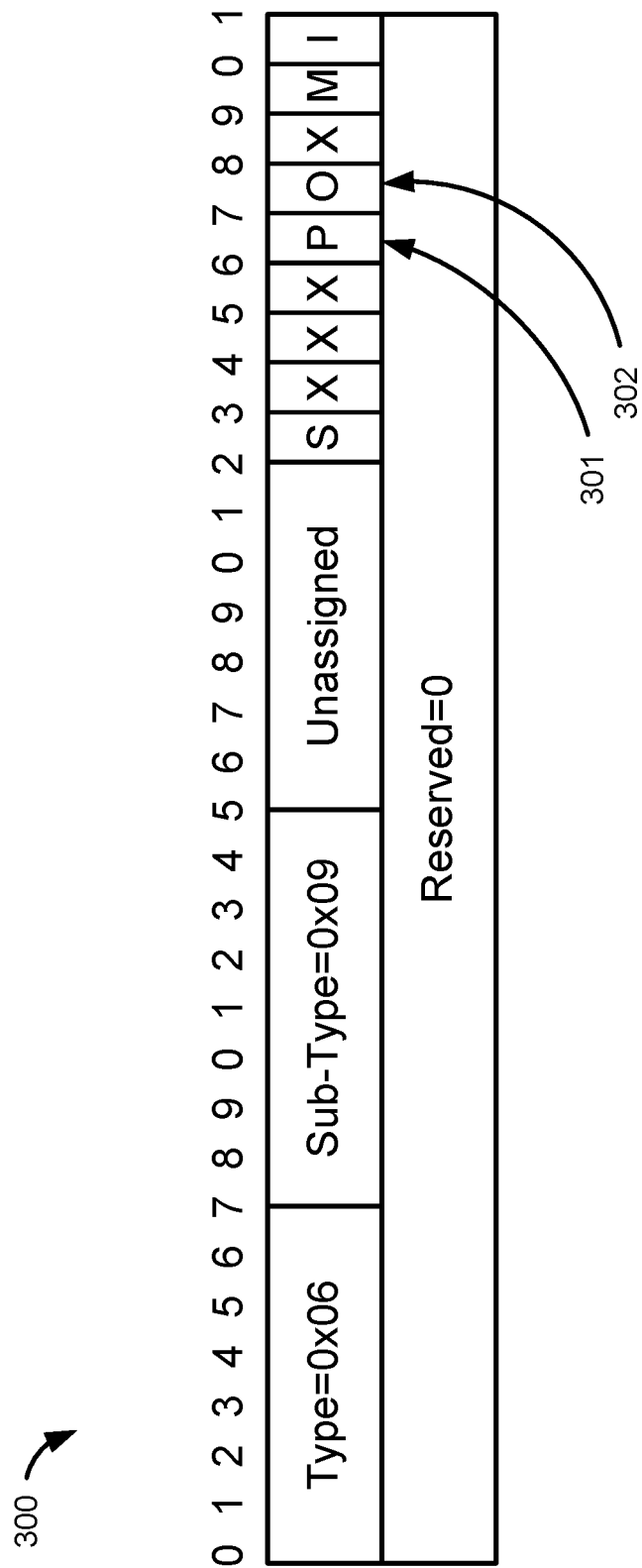
FIG. 3 shows a diagram of an Inclusive Multicast Ethernet Tag message, according to an embodiment.

FIG. 3 shows a diagram 300 of an Inclusive Multicast Ethernet Tag (IMET) message, according to an embodiment. As mentioned above, an IMET message may be used to call out broadcast domains in the EVPN. Such IMET messages may be used to determine PIM neighborship. For instance, when IMET messages are received from other PEs (e.g., via a route reflector), they may be imported into the MAC VRF table. Information in the IMET message such as the source address may also be used to populate a PIM neighbor table. In an EVPN, an IMET message may be sent to a route reflector and the route reflector may in turn send copies of the IMET message to other provider edge devices.

As mentioned above, when an IMET route message with the "Multicast Flags" extended community attached to it is imported into a PE's Media Access Control (MAC) Virtual Routing and Forwarding (VRF) table, with both PEG flag and the OISM flag set, PIM neighborship can be declared with the originating PE device as being up. Conversely, when the IMET message is withdrawn or when the PEG and/or OISM flags are reset (e.g., set to off), the PIM neighborship with the originating tunnel end point (TEP) may be immediately declared as down (e.g., without waiting for multiple missed hello messages as in other techniques).

Diagram 300 shows an exemplary IMET message format including a PEG flag (labeled "P") 301 and an OISM flag (labeled "O") 302. The OISM flag indicates whether OISM techniques (e.g., optimized multicasting) may not be used. If not, the PE may not be declared as a valid neighbor. PEG flag indicates whether the source PE has any PIM speakers attached to it. If not, the source PE may not be declared as a PIM neighbor because the source PE may not perform any PIM related actions.

As mentioned above, a PE may determine whether both the PEG flag and the OISM flag set of an IMET message are set, thereby indicating that the source PE is capable of using IMET messages for PIM neighborship instead of PIM hello messages. The PE may use information such as the source address in the IMET message to update the PIM neighbor table. When the IMET message is withdrawn or when the PEG and/or OISM flags are reset (e.g., set to off), the PIM neighborship may be immediately declared as down and the PIM neighbor table may be updated accordingly.

For reference, a description and diagram of the PIM hello message format as described in the PIM-SM Specification (RFC 4601) is provided below.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|PIM Ver| Type  |   Reserved    |           Checksum            |
+-+-+-+-+-+-+-+-+-+-+-+-+-+-+-+-+-+-+-+-+-+-+-+-+-+-+-+-+-+-+-+-+
|          OptionType           |         OptionLength          |
+-+-+-+-+-+-+-+-+-+-+-+-+-+-+-+-+-+-+-+-+-+-+-+-+-+-+-+-+-+-+-+-+
|                          OptionValue                          |
|                              ...                              |
+-+-+-+-+-+-+-+-+-+-+-+-+-+-+-+-+-+-+-+-+-+-+-+-+-+-+-+-+-+-+-+-+
|                               .                               |
|                               .                               |
|                               .                               |
+-+-+-+-+-+-+-+-+-+-+-+-+-+-+-+-+-+-+-+-+-+-+-+-+-+-+-+-+-+-+-+-+
|          OptionType           |         OptionLength          |
+-+-+-+-+-+-+-+-+-+-+-+-+-+-+-+-+-+-+-+-+-+-+-+-+-+-+-+-+-+-+-+-+
|                          OptionValue                          |
|                              ...                              |
+-+-+-+-+-+-+-+-+-+-+-+-+-+-+-+-+-+-+-+-+-+-+-+-+-+-+-+-+-+-+-+-+
```

The header of a PIM message may contain PIM Ver., Type, Reserved, and Checksum fields, which are described below.

PIM Ver: PIM Version number.

Type: Types for specific PIM messages. PIM Types are: 0=Hello; 1=Register; 2=Register-Stop; 3=Join/Prune; 4=Bootstrap; 5=Assert; 6=Graft (used in PIM-DM only); 7=Graft-Ack (used in PIM-DM only); 8=Candidate-RP-Advertisement.

Reserved: Set to zero on transmission. Ignored upon receipt.

Checksum: The checksum is a standard IP checksum.

A PIM hello message may further contain the following fields: OptionType, OptionLength, OptionValue, and additional groups of OptionType, OptionLength, and OptionValue. Option Type is the type of the option given in the following OptionValue field. The OptionLength is the length of the OptionValue field in bytes. The OptionValue is a variable length field carrying the value of the option. These option fields may indicate hold times, a prune delay option, designated router priority, generation ID, an address list, and so on.

Figure 4:
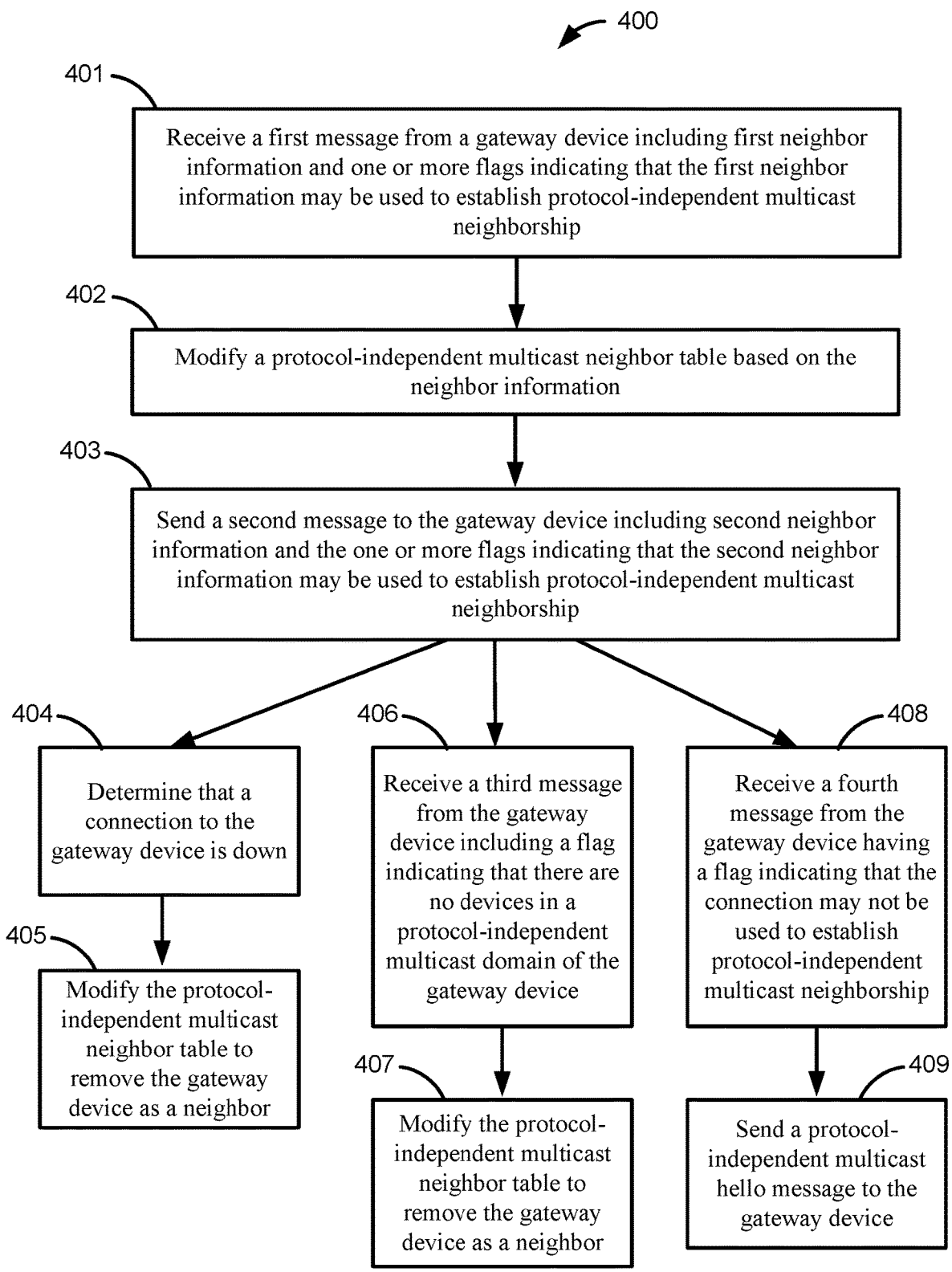
FIG. 4 shows a flowchart of a method for PIM neighborship, according to an embodiment.

FIG. 4 shows a flowchart 400 of a method for PIM neighborship, according to an embodiment. The method may be implemented by a computer device such as a router, provider edge device, or gateway device. For example, the method may be implemented by Provider Edge device 121, 122, or 123 of FIG. 1 or by the Provider Edge device 210 of FIG. 2.

At 401, the computer device performing the method may receive a first message from a gateway device including first neighbor information and one or more flags indicating that the first neighbor information may be used to establish protocol-independent multicast (PIM) neighborship (e.g., instead of using a PIM hello message to establish PIM neighborship). The first message may be received using a network interface of the computer device, for example. The gateway device may be a provider edge gateway device. The first message may be received over a network connection. The network connection may be a Transmission Control Protocol (TCP). The first message may be an Inclusive Multicast Ethernet Tag (IMET) message. The first message may be used to detect BGP peers as well as indicating neighbor information to establish PIM neighborship. The first neighbor information may be a source address (e.g., a source address included in an IMET message). The one or more flags may include a Provider Edge Gateway flag and an Optimized Inter-Subnet Multicast (OISM) flag of an IMET message, for example. Also, the first message (e.g., an IMET message) may be used to modify a media access control virtual route forwarding table based on the first neighbor information.

At 402, the computer device may modify a protocol-independent multicast neighbor table based on the first neighbor information. The modifying of the protocol-independent multicast neighbor table may include adding a protocol-independent multicast domain of the gateway device as a neighbor. For example, a source address in an IMET message may be used to identify PIM neighborship and the source address from the IMET message may be written to a PIM neighbor table. After establishing PIM neighborship using the message (e.g., IMET message), protocol-independent multicast hello messages may not be sent to the gateway device. That is, the network connection (e.g., TCP connection) and the IMET message may be used to maintain neighborship instead of using PIM hello messages. This may continue until a further message is received from the gateway device having one or more flags indicating that the neighbor information of that further message may not be used to establish protocol-independent multicast neighborship. For example, a message may be received without the PEG flag set (indicating that there are no PIM speakers in the PIM domain of the gateway device) or a message may be received without the OISM flag set (indicating that optimized multicast may no longer be used, and so regular PIM hello broadcast should resume).

As discussed above, the first message received from the gateway device indicated that first neighbor information may be used to establish PIM neighborship. This method may also send messages including second neighbor information and an indication that the second neighbor information may be used to establish PIM neighborship (e.g., instead of using PIM hello messages to establish PIM neighborship). At 403, the computer device may send a second message to the gateway device including second neighbor information and the one or more flags indicating that the second neighbor information may be used to establish protocol-independent multicast neighborship. The second message may be sent using the network interface of the computer device, for example. The second message may also be an IMET message including the PEG and OISM flags. The second message may be used to detect BGP peers as well as indicating that the second neighbor information may be used to establish PIM neighborship. Accordingly, he second message enables the gateway device to also stop sending PIM hello messages as discussed above. In view of the description given above with respect to FIGS. 1-3, neither the computer device nor the gateway device need to send and/or receive PIM hello messages to determine the status of each other as PIM neighbors because they may use the network connection (i.e., the connection over which the first message was received) provides reliable message delivery (e.g., using sequence numbers, acknowledgements, retransmission, checksums, etc.), to determine PIM neighborship and PIM neighbor connection status instead of using PIM hello messages to do the same. A disadvantage of PIM hello messages is that they are not reliable (e.g., they do not provide for acknowledgements, retransmission, etc.)

At 404, the method may determine that the network connection to the gateway device is down. For example the network connection may be a TCP connection, which provides reliable message delivery. The determination that the network connection is down may be based on a TCP disconnect. Accordingly, at 405, the method may modify the protocol-independent multicast neighbor table to remove the gateway device as a neighbor in response to determining that the network connection is down. For example, if a TCP connection to the gateway device is disconnected, the gateway may be removed as a PIM neighbor in the PIM neighbor table. Accordingly, neighborship may be updated upon detection of the disconnection instead of waiting three and a half times the normal PIM hello interval to detect disconnection.

At 406, the method may receive a third message from the gateway device including a flag indicating that there are no devices in a protocol-independent multicast domain of the gateway device. For example, a PEG flag of an IMET message may not be set. This may indicate that there are no PIM speakers in a corresponding PIM domain of the gateway device. Accordingly, at 407, the method may modify the protocol-independent multicast neighbor table to remove the gateway device as a neighbor.

At 408, the method may receive a fourth message from the gateway device having a flag indicating that the connection may not be used to establish protocol-independent multicast neighborship. For example, an OISM flag of an IMET message may not be set, indicating that optimized multicast may no longer be used. Accordingly, at 409, the method may send a protocol-independent multicast hello message to the gateway device. That is, PIM hello messages should be sent because OISM may no longer be used.

Additional Embodiments

Some embodiments provide a computer-implemented method. The method includes receiving, by a computer device, a first message from a gateway device over a network connection. The first message includes first neighbor information and one or more flags indicating that the first neighbor information may be used to establish protocol-independent multicast neighborship. The method further includes modifying, by the computer device, a protocol-independent multicast neighbor table based on the first neighbor information. The method further includes sending, by the computer device, a second message to the gateway device over the network connection. The second message includes second neighbor information and the one or more flags indicating that the second neighbor information may be used to establish protocol-independent multicast neighborship.

In some embodiments of the computer-implemented method, the modifying of the protocol-independent multicast neighbor table includes adding a protocol-independent multicast domain of the gateway device as a neighbor of the computer device.

In some embodiments of the computer-implemented method, the method further includes receiving, by the computer device, a third message from the gateway device over the network connection. The third message includes a flag indicating that there are no protocol-independent multicast devices in a protocol-independent multicast domain of the gateway device. In such embodiments the method further includes modifying the protocol-independent multicast neighbor table to remove the gateway device as a neighbor.

In some embodiments of the computer-implemented method, protocol-independent multicast hello messages are not sent to the gateway device until a later message is received from the gateway device having one or more flags indicating that neighbor information of the later message may not be used to establish protocol-independent multicast neighborship.

In some embodiments of the computer-implemented method, the method further includes receiving, by the computer device, a fourth message from the gateway device over the network connection. The fourth message has a flag indicating that neighbor information of the fourth message may not be used to establish protocol-independent multicast neighborship. In such embodiments the method further includes sending, by the computer device, a protocol-independent multicast hello message to the gateway device in response to receiving the fourth message.

In some embodiments of the computer-implemented method, the method further includes modifying, by the computer device, a media access control virtual route forwarding table based on the first neighbor information.

In some embodiments of the computer-implemented method the first message is an inclusive multicast Ethernet tag message.

In some embodiments of the computer-implemented method, the network connection uses Transmission Control Protocol.

In some embodiments of the computer-implemented method, the one or more flags include a Provider Edge Gateway flag and an Optimized Inter-Subnet Multicast flag.

In some embodiments of the computer-implemented method, the gateway device is a provider edge gateway.

In some embodiments of the computer-implemented method, the network connection is in an Ethernet virtual private network.

Some embodiments provide a computer system. The computer system comprises one or more processors and one or more machine-readable medium coupled to the one or more processors. The one or more machine-readable medium storing computer program code comprising sets of instructions executable by the one or more processors. The sets of instructions executable to receive a first message from a gateway device over a network connection. The first message includes first neighbor information and one or more flags indicating that the first neighbor information may be used to establish protocol-independent multicast neighborship. The sets of instructions are further executable to modify a protocol-independent multicast neighbor table based on the first neighbor information. The sets of instructions are further executable to send a second message to the gateway device over the network connection. The second message includes second neighbor information and the one or more flags indicating that the second neighbor information may be used to establish protocol-independent multicast neighborship.

In some embodiments of the computer system, the modifying of the protocol-independent multicast neighbor table includes adding a protocol-independent multicast domain of the gateway device as a neighbor.

In some embodiments of the computer system, the computer program code further comprises sets of instructions executable by the one or more processors to receive a third message from the gateway device over the network connection. The third message includes second neighbor information and a flag indicating that there are no protocol-independent multicast devices in a protocol-independent multicast domain of the gateway device. The computer program code further comprises sets of instructions executable to modify the protocol-independent multicast neighbor table to remove the gateway device as a neighbor.

In some embodiments of the computer system, protocol-independent multicast hello messages are not sent to the gateway device until a later message is received from the gateway device having one or more flags indicating that neighbor information of the later message may not be used to establish protocol-independent multicast neighborship.

In some embodiments of the computer system, the computer program code further comprises sets of instructions executable by the one or more processors to receive a fourth message from the gateway device having a flag indicating that neighbor information of the fourth message may not be used to establish protocol-independent multicast neighborship and send a protocol-independent multicast hello message to the gateway device in response to receiving the fourth message.

In some embodiments of the computer system, the computer program code further comprises sets of instructions executable by the one or more processors to modify a media access control virtual route forwarding table based on the first neighbor information.

Some embodiments provide one or more non-transitory computer-readable medium storing computer program code comprising sets of instructions. The computer program code includes sets of instructions to receive a first message from a gateway device over a network connection. The first message includes first neighbor information and one or more flags indicating that the first neighbor information may be used to establish protocol-independent multicast neighborship. The computer program code further includes sets of instructions to modify a protocol-independent multicast neighbor table based on the first neighbor information. The computer program code further includes sets of instructions to send a second message to the gateway device over the network connection. The second message includes second neighbor information and the one or more flags indicating that the second neighbor information may be used to establish protocol-independent multicast neighborship.

Advantages

As mentioned above, there are several shortcomings of using PIM hello messages in an EVPN as in prior techniques (e.g., as presented in certain EVPN draft specifications). The technique presented herein of using an IMET message for modifying PIM neighborship in addition to modifying the MAC VRF solves these issues. For instance, one drawback of prior techniques is that detecting that a PEG router is down may take three and a half times the PIM hello interval. The present disclosure solves this issue. Instead of tracking PIM hellos, a TCP connection may be used to quickly determine whether a gateway has disconnected. Another drawback of prior techniques is that PIM hello messages are delivered using "best effort," which does not guarantee delivery or provide for retransmission of corrupted or lost packets. This may be problematic if the EVPN network is unreliable, especially where the PEG device is many hops away. The techniques of the present disclosure solves this by using a reliable TCP connection (e.g., providing for retransmission) is used to determine PIM neighborship, instead of using "best effort" messages (e.g., PIM hello messages). Another drawback of prior techniques is that PIM hello messages are a broadcast message and are sent to every device in the EVPN network that shares a broadcast domain such that the message is multiplied to other PE devices in the network, thereby flooding the network to a certain extent. The present disclosure solves this issue using OISM instead of broadcast to conduct PIM neighborship.

In the above description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein. While certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. Furthermore, the terms "first," "second," "third," "fourth," etc., used herein do not necessarily indicate an ordering or sequence unless indicated. These terms may merely be used for differentiation between different objects or elements without specifying an order. The terms "component," "process," "unit," and "module" may refer to a hardware circuit or to a set of program code or instructions.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer-implemented method, comprising:
receiving, by a computer device, a first message from a gateway device over a network connection, the first message including first neighbor information and one or more flags indicating that the first neighbor information is used to establish protocol-independent multicast neighborship;
modifying, by the computer device, a protocol-independent multicast neighbor table based on the first neighbor information; and
sending, by the computer device, a second message to the gateway device over the network connection, the second message including second neighbor information and the one or more flags indicating that the second neighbor information is used to establish protocol-independent multicast neighborship.

2. The computer-implemented method of claim 1, wherein the modifying of the protocol-independent multicast neighbor table includes adding a protocol-independent multicast domain of the gateway device as a neighbor of the computer device.

3. The computer-implemented method of claim 1, further comprising:
receiving, by the computer device, a third message from the gateway device over the network connection, the third message including a flag indicating that there are no protocol-independent multicast devices in a protocol-independent multicast domain of the gateway device; and
modifying, by the computer device, the protocol-independent multicast neighbor table to remove the gateway device as a neighbor.

4. The computer system of claim 1, wherein protocol-independent multicast hello messages are not sent to the gateway device until a later message is received from the gateway device having one or more flags indicating that neighbor information of the later message is not used to establish protocol-independent multicast neighborship.

5. The computer-implemented method of claim 1, further comprising:
receiving, by the computer device, a fourth message from the gateway device over the network connection, the fourth message having a flag indicating that neighbor information of the fourth message is not used to establish protocol-independent multicast neighborship; and
sending a protocol-independent multicast hello message to the gateway device in response to receiving the fourth message.

6. The computer-implemented method of claim 1, further comprising:
modifying, by the computer device, a media access control virtual route forwarding table based on the first neighbor information.

7. The computer-implemented method of claim 1, wherein the first message is an inclusive multicast Ethernet tag message, wherein the network connection uses Transmission Control Protocol connection, and wherein the one or more flags include a Provider Edge Gateway flag and an Optimized Inter-Subnet Multicast flag.

8. The computer-implemented method of claim 1, wherein the computer device and the gateway device are both provider edge gateways.

9. The computer-implemented method of claim 1, wherein the network connection is in an Ethernet virtual private network.

10. A computer system, comprising:
one or more processors; and
one or more machine-readable medium coupled to the one or more processors and storing computer program code comprising sets of instructions executable by the one or more processors to:
receive a first message from a gateway device over a network connection, the first message including first neighbor information and one or more flags indicating that the first neighbor information is used to establish protocol-independent multicast neighborship;
modify a protocol-independent multicast neighbor table based on the first neighbor information; and
send a second message to the gateway device over the network connection, the second message including second neighbor information and the one or more flags indicating that the second neighbor information is used to establish protocol-independent multicast neighborship.

11. The computer system of claim 10, wherein the modifying of the protocol-independent multicast neighbor table includes adding a protocol-independent multicast domain of the gateway device as a neighbor.

12. The computer system of claim 10, wherein the computer program code further comprises sets of instructions executable by the one or more processors to:
receive a third message from the gateway device over the network connection, the third message including second neighbor information and a flag indicating that there are no protocol-independent multicast devices in a protocol-independent multicast domain of the gateway device; and
modify the protocol-independent multicast neighbor table to remove the gateway device as a neighbor of the computer system.

13. The computer system of claim 10, wherein protocol-independent multicast hello messages are not sent to the gateway device until a later message is received from the gateway device having one or more flags indicating that neighbor information of the later message is not used to establish protocol-independent multicast neighborhood.

14. The computer system of claim 10, wherein the computer program code further comprises sets of instructions executable by the one or more processors to:
receive a fourth message from the gateway device having a flag indicating that neighbor information of the fourth message is not used to establish protocol-independent multicast neighborhood; and
send a protocol-independent multicast hello message to the gateway device in response to receiving the fourth message.

15. The computer system of claim 10, wherein the computer program code further comprises sets of instructions executable by the one or more processors to:
modify a media access control virtual route forwarding table based on the first neighbor information.

16. One or more non-transitory computer-readable medium storing computer program code comprising sets of instructions to:
receive a first message from a gateway device over a network connection, the first message including first neighbor information and one or more flags indicating that the first neighbor information is used to establish protocol-independent multicast neighborhood;
modify a protocol-independent multicast neighbor table based on the first neighbor information; and
send a second message to the gateway device over the network connection, the second message including second neighbor information and the one or more flags indicating that the second neighbor information is used to establish protocol-independent multicast neighborship.

17. The non-transitory computer-readable medium of claim 16, wherein the modifying of the protocol-independent multicast neighbor table includes adding a protocol-independent multicast domain of the gateway device as a neighbor.

18. The non-transitory computer-readable medium of claim 16, wherein the computer program code further comprises sets of instructions to:
receive a third message from the gateway device over the network connection, the third message including second neighbor information and a flag indicating that there are no protocol-independent multicast devices in a protocol-independent multicast domain of the gateway device; and
modify the protocol-independent multicast neighbor table to remove the gateway device as a neighbor.

19. The non-transitory computer-readable medium of claim 16, wherein protocol-independent multicast hello messages are not sent to the gateway device until a later message is received from the gateway device having one or more flags indicating that neighbor information of the later message is not used to establish protocol-independent multicast neighborship.

20. The non-transitory computer-readable medium of claim 16, wherein the computer program code further comprises sets of instructions to:
receive a fourth message from the gateway device having a flag indicating that neighbor information of the fourth message is not used to establish protocol-independent multicast neighborship; and
send a protocol-independent multicast hello message to the gateway device in response to receiving the fourth message.

\* \* \* \* \*